United States Patent
Kimura

(10) Patent No.: US 11,767,270 B2
(45) Date of Patent: Sep. 26, 2023

(54) JOINING MATERIAL AND SILICON CARBIDE BASED HONEYCOMB STRUCTURE

(71) Applicant: NGK INSULATORS, LTD., Nagoya (JP)

(72) Inventor: Keisuke Kimura, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/803,092

(22) Filed: Feb. 27, 2020

(65) Prior Publication Data

US 2020/0308069 A1 Oct. 1, 2020

(30) Foreign Application Priority Data

Mar. 27, 2019 (JP) ................................. 2019-061681

(51) Int. Cl.
*B01D 46/24* (2006.01)
*C04B 38/00* (2006.01)
*C04B 35/565* (2006.01)
*B01D 39/20* (2006.01)
*C04B 26/28* (2006.01)

(52) U.S. Cl.
CPC ...... *C04B 38/0019* (2013.01); *B01D 39/2068* (2013.01); *B01D 46/2418* (2013.01); *B01D 46/2425* (2013.01); *B01D 46/2448* (2013.01); *B01D 46/2478* (2021.08); *B01D 46/24491* (2021.08); *B01D 46/24494* (2021.08); *B01D 46/24495* (2021.08); *C04B 26/285* (2013.01); *C04B 35/565* (2013.01); *C04B 2235/3826* (2013.01)

(58) Field of Classification Search
None
See application file for complete search history.

(56) References Cited

U.S. PATENT DOCUMENTS

| | | | | |
|---|---|---|---|---|
| 2005/0050845 | A1* | 3/2005 | Masukawa | B01D 46/2429 52/782.1 |
| 2006/0288650 | A1* | 12/2006 | Tanaka | B01J 23/10 51/309 |
| 2009/0011178 | A1* | 1/2009 | Masukawa | C04B 38/0019 428/116 |
| 2010/0112280 | A1 | 5/2010 | Iwamoto et al. | |

(Continued)

FOREIGN PATENT DOCUMENTS

JP 2017-178722 A1 10/2017
JP 2018-034112 A 3/2018

OTHER PUBLICATIONS

Chinese Office Action (with English translation), Chinese Application No. 202010101060.8, dated May 7, 2022 (13 pages).

*Primary Examiner* — Mary I Omori
(74) *Attorney, Agent, or Firm* — BURR PATENT LAW, PLLC

(57) ABSTRACT

A joining material used for joining side surfaces of a plurality of silicon carbide-based honeycomb segments to each other to produce a silicon carbide-based honeycomb structure. The joining material contains from 0.1 to 50% by mass of processed powder generated in the production of the silicon carbide-based honeycomb segments and/or the silicon carbide-based honeycomb structure. The joining material has an average particle diameter D50 of from 0.5 to 60 μm.

7 Claims, 1 Drawing Sheet

(56) References Cited

U.S. PATENT DOCUMENTS

| | | | | |
|---|---|---|---|---|
| 2010/0119769 | A1* | 5/2010 | Watanabe | C04B 28/005 |
| | | | | 428/116 |
| 2011/0219736 | A1* | 9/2011 | Hiramatsu | F01N 3/0222 |
| | | | | 55/489 |
| 2013/0316130 | A1* | 11/2013 | Takahashi | C04B 35/573 |
| | | | | 428/116 |
| 2015/0274602 | A1* | 10/2015 | Ishii | B28B 1/002 |
| | | | | 156/89.22 |
| 2015/0275725 | A1* | 10/2015 | Ichikawa | C04B 28/24 |
| | | | | 428/116 |
| 2017/0036432 | A1* | 2/2017 | Ishii | C04B 35/195 |
| 2017/0284246 | A1 | 10/2017 | Kimura et al. | |
| 2019/0300440 | A1* | 10/2019 | Kodama | C04B 41/009 |

* cited by examiner

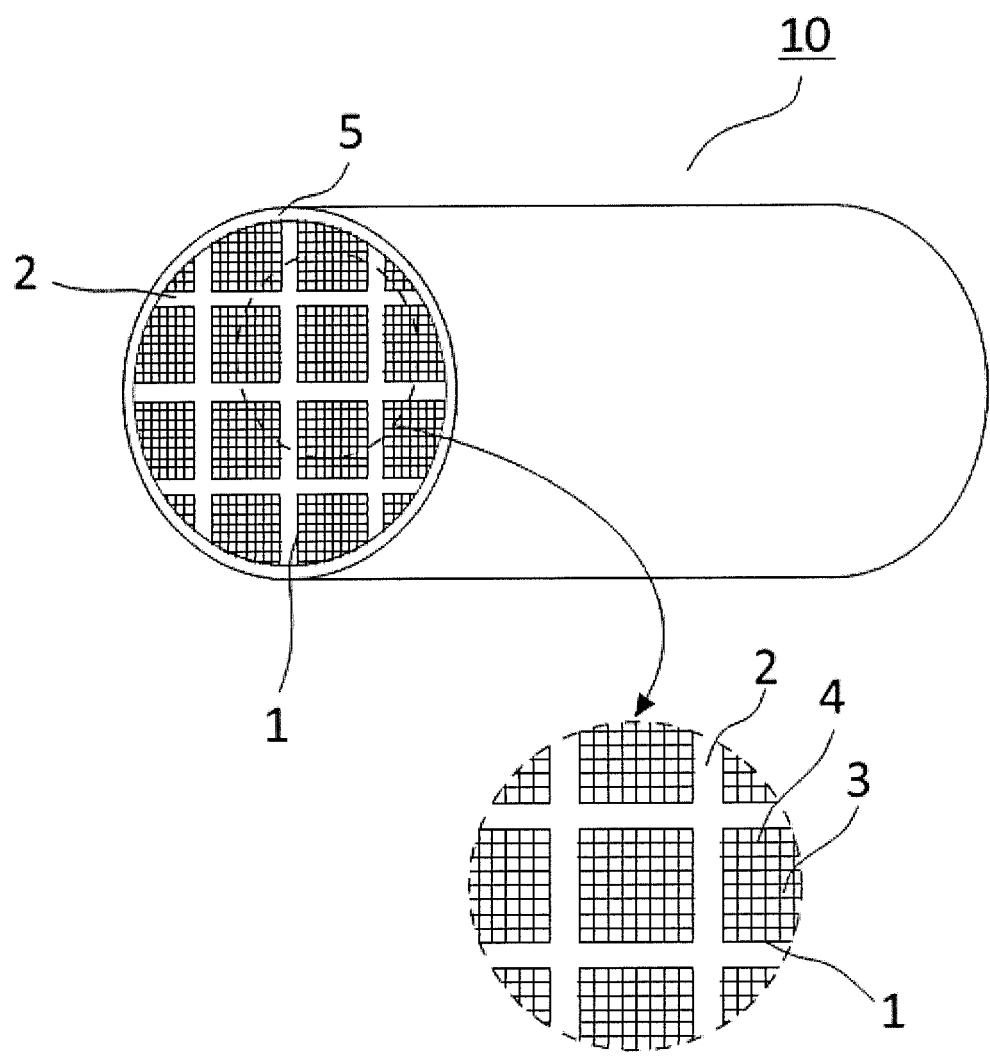

JOINING MATERIAL AND SILICON CARBIDE BASED HONEYCOMB STRUCTURE

FIELD OF THE INVENTION

The present invention relates to a joining material and a silicon carbide-based honeycomb structure.

BACKGROUND OF THE INVENTION

A honeycomb structure is widely used as a dust collecting filter for an exhaust gas, for example a diesel particulate filter (DPF) and a gasoline particulate filter (GPF) for trapping and removing particulate matters (particulates) contained in an exhaust gas. As a honeycomb structure used for such applications, for example, a silicon carbide-based honeycomb structure including a plurality of silicon carbide-based honeycomb segments and joining layers that join side surfaces of the respective silicon carbide-based honeycomb segments to each other is known. Here, the silicon carbide-based honeycomb structure means a honeycomb structure made of a material containing silicon carbide as a main component, and includes a honeycomb structure made of a material only composed of silicon carbide such as recrystallized SiC, and a composite material of silicon carbide, metallic silicon and other components such as glass. The joining layer is formed using a joining material containing inorganic powder such as silicon carbide powder and alumina powder, inorganic fibers such as mullite fibers, a pore former such as hollow particles, a binder, a dispersant, and the like (for example, see Patent Literature 1).

On the other hand, in the production of the silicon carbide-based honeycomb structure as described above, processed powder is generated during the production of the silicon carbide-based honeycomb segments and/or the silicon carbide-based honeycomb structure. Illustrative examples of the processed powder include ground powder generated when grinding the silicon carbide-based honeycomb segments and/or the silicon carbide-based honeycomb structure into a predetermined shape, and powder obtained by crushing defective products of the silicon carbide-based honeycomb segments and/or the silicon carbide-based honeycomb structure. Such processed powder may be reused in the production of silicon carbide-based honeycomb segments, but the reusing in other applications is not progressing very much.

CITATION LIST

Patent Literature

Patent Literature 1: Japanese Patent Application Publication No. 2017-178722 A

SUMMARY OF INVENTION

The present invention relates to a joining material used for joining side surfaces of a plurality of silicon carbide-based honeycomb segments to each other to produce a silicon carbide-based honeycomb structure, the joining material containing from 0.1 to 50% by mass of processed powder generated in the production of the silicon carbide-based honeycomb segments and/or the silicon carbide-based honeycomb structure, the joining material having an average particle diameter D50 of from 0.5 to 60 μm.

Further, the present invention relates to a silicon carbide-based honeycomb structure, the silicon carbide-based honeycomb structure comprising: a plurality of silicon carbide-based honeycomb segments; and joining layers, the joining layers joining side surfaces of the plurality of silicon carbide-based honeycomb segments to each other, wherein each of the joining layers is a cured layer of the joining material.

According to the present invention, it is possible to provide a joining material and a silicon carbide-based honeycomb structure, which can effectively utilize processed powder generated in the production of the silicon carbide-based honeycomb segments and/or the silicon carbide-based honeycomb structure.

BRIEF DESCRIPTION OF THE DRAWINGS

FIG. 1 shows a perspective view and a partially enlarged view of a silicon carbide-based honeycomb structure according to an embodiment of the present invention.

DETAILED DESCRIPTION OF THE INVENTION

The joining layer of the silicon carbide-based honeycomb structure is required to have a high joining strength and a low Young's modulus, but when the joining strength of the joining layer is increased, the Young's modulus of the joining layer is also increased, which is a trade-off relationship. When the Young's modulus of the joining layer is higher, a function of relieving thermal stress is difficult to be exerted, so that durability of the silicon carbide-based honeycomb structure is not sufficiently ensured. Therefore, for the joining material used for forming the joining layer of the silicon carbide-based honeycomb structure, types and contents of components used are finely defined such that the joining strength is higher and the Young's modulus is lower. Therefore, it has been believed that it is difficult to effectively utilize the processed powder generated in the production of the silicon carbide-based honeycomb segments and/or the silicon carbide-based honeycomb structure for the joining material.

The present invention has been made to solve the above problems. An object of the present invention is to provide a joining material and a silicon carbide-based honeycomb structure, which can effectively utilize processed powder generated in the production of the silicon carbide-based honeycomb segments and/or the silicon carbide-based honeycomb structure.

As a result of intensive studies to solve the above problems, the present inventors have focused on the fact that a content and an average particle diameter D50 of the processed powder generated in the production of the silicon carbide-based honeycomb segments and/or the silicon carbide-based honeycomb structure are closely related to the joining strength and Young's modulus of the joining layer, and have found that by controlling these, the processed powder can be effectively utilized for the joining material. Based on the findings, the present inventors have completed the present invention.

Hereinafter, embodiments according to the present invention will be specifically described with reference to the drawings. It is to understand that the present invention is not limited to the following embodiments, and various modifications and improvements, which will be within the scope of the present invention, may be made based on ordinary knowledge of a person skilled in the art, without departing from the spirit of the present invention.

A joining material according to an embodiment of the present invention is used for joining side surfaces of a plurality of silicon carbide-based honeycomb segments to each other to produce a silicon carbide-based honeycomb structure. Here, FIG. 1 shows a perspective view and a partially enlarged view of a silicon carbide-based honeycomb structure. As shown in FIG. 1, a silicon carbide-based honeycomb structure 10 includes: a plurality of silicon carbide-based honeycomb segments 1 and joining layers 2 that join the side surfaces of the plurality of silicon carbide-based honeycomb segments 1 to each other. Each of the joining layers 2 is a cured layer of the joining material.

The silicon carbide-based honeycomb segments 1 are not particularly limited, and those known in the art can be used. In an embodiment, each of the silicon carbide-based honeycomb segments 1 includes partition walls 4 that define a plurality of cells 3 extending from one end face to other end face. A shape of a cross section perpendicular to an extending direction of the cells 3 of each of the silicon carbide-based honeycomb segments 1 is not particularly limited, and it may be various shapes such as a triangle, a rectangle, a hexagon, and an octagon. The rectangle such as a square and an oblong is preferable. The silicon carbide-based honeycomb segments 1 having such a shape can facilitate the production of the silicon carbide-based honeycomb structure 10. Further, a shape of each cell 3 of each silicon carbide-based honeycomb segment 1 (a shape of each cell 3 in a cross section perpendicular to the extending direction of the cells 3) is not particularly limited, and it may be various shapes such as a triangle, a rectangle, a hexagon, an octagon, a circle, or the like. It is preferably the rectangle (a square or an oblong).

A thickness of each partition wall 4 is not particularly limited, and it may preferably be from 4 to 70 mil (from 0.010 to 0.177 cm), and more preferably from 4.5 to 30 mil (from 0.011 to 0.076 cm), and still more preferably from 5 to 20 mil (from 0.013 to 0.050 cm). The thickness of each partition wall 4 of 4 mil (0.010 cm) or more can ensure sufficient strength. Further, the thickness of each partition wall 4 of 70 mil (0.177 cm) or less can suppress an increase in pressure loss. Therefore, for example, when the silicon carbide-based honeycomb structure 10 is used for a DPF or the like, a decrease in engine output can be suppressed.

Each of the silicon carbide-based honeycomb segments 1 has any cell density, including, but not limited to, preferably from 50 to 500 cells/in$^2$ (from 7.7 to 77.5 cells/cm$^2$), and more preferably from 70 to 450 cells/in$^2$ (from 10.8 to 69.8 cells/cm$^2$), and even more preferably from 80 to 400 cells/in$^2$ (from 12.4 to 62.0 cells/cm$^2$). The cell density of each silicon carbide-based honeycomb segment 1 of 50 cells/in$^2$ (7.7 cells/cm$^2$) or more can ensure sufficient strength. Further, the cell density of each silicon carbide-based honeycomb segment 1 of 500 cells/in$^2$ (77.5 cells/cm$^2$) or less can suppress an increase in pressure loss.

The silicon carbide-based honeycomb segments 1 can be produced according to a method known in the art. More particularly, they are produced as follows. First, a binder, a dispersant (a surfactant), a pore former, water, and the like are added to a ceramic raw material, mixed and kneaded to obtain a green body. The green body is then extruded into a predetermined honeycomb shape, cut into a desired length, and dried by microwaves, hot air or the like, and then fired. After the firing, grinding or the like is performed as needed in order to obtain a predetermined shape.

The ceramic raw material is inorganic powder and inorganic fibers formed from a ceramic raw material. The ceramic raw material is not particularly limited as long as it contains a silicon carbide-based ceramic as a main component. As used herein, the main component means that a percentage to the whole exceeds 50% by mass. Examples of the silicon carbide-based ceramic include silicon carbide or silicon-silicon carbide based composite materials. Examples of other ceramic raw materials include cordierite-forming raw materials, cordierite, mullite, alumina, titania, spinel, silicon carbide-cordierite composite materials, lithium aluminum silicate, aluminum titanate, iron-chromium-aluminum alloys and the like. These can be used alone or in combination of two or more. As used herein, the term "cordierite-forming raw material" is a ceramic raw material which is formulated so as to have a chemical composition having silica in a range of from 42 to 56% by mass, alumina in a range of from 30 to 45% by mass, and magnesia in a range of from 12 to 16% by mass, and which is fired to form cordierite. In the case of the silicon-silicon carbide based composite material, the ceramic raw material is a mixture of silicon carbide powder and metallic silicon powder. The content of the ceramic raw material may preferably be from 40 to 90% by mass relative to the entire forming raw material.

Non-limiting examples of the binder include inorganic binders such as colloidal silica (silica sol), alumina sol, and clays such as bentonite and montmorillonite; and organic binders such as methyl cellulose, carboxymethyl cellulose, hydroxypropoxyl cellulose, hydroxyethyl cellulose, polyvinyl alcohol (PVA), polyvinyl butyral (PVB) or various water-absorbing resins. These can be used alone or in combination of two or more.

Non-limiting examples of the dispersant (surfactant) that can be used include PEG oleate, ethylene glycol, dextrin, fatty acid soaps, polyalcohol and the like. These can be used alone or in combination of two or more. The pore former is not particularly limited as long as it forms pores after firing, and it includes starch, foaming resins, water absorbent resins, silica gel, carbon and the like. These can be used alone or in combination of two or more.

Further, in each of the silicon carbide-based honeycomb segments 1, plugged portions for plugging one end face of the cells may be formed on any one of two end faces of each silicon carbide-based honeycomb segment 1. In general, adjacent cells are alternately plugged such that one end face and the other end face present a complementary checkered pattern. The plugged portions are preferably made of the same material as that of the silicon carbide-based honeycomb segment 1 in order to decrease a thermal expansion difference between the plugged portions and the silicon carbide-based honeycomb segment 1.

When forming the plugged portions for the cells 3, the firing may be performed before forming the plugged portions for the cells 3, or may be performed with the firing of the plugged portions after forming the plugged portions for the cells 3. The plugged portions for the cells 3 may be formed by a method known in the art. More particularly, the method is carried out by attaching a sheet onto the end face of each silicon carbide-based honeycomb segment 1, forming holes at positions corresponding to the cells 3 to be plugged in the sheet, and in a state where the sheet is attached, immersing the end face of the silicon carbide-based honeycomb segment 1 in a plugging slurry obtained by forming a slurry of components for the plugged portions, and filling the open ends of the cells 3 to be plugged with the plugging slurry through the holes formed in the sheet, and drying and/or firing it to cure it.

The joining material contains from 0.1 to 50% by mass of processed powder generated in the production of the silicon carbide-based honeycomb segments 1 and/or the silicon carbide-based honeycomb structure 10. The processed powder of 0.1% by mass or more can allow the processed powder to be effectively used as the joining material. Further, the processed powder of 50% by mass or less can allow the joining layers 2 having good joining strength to be formed. In terms of effective utilization of the processed powder, the content of the processed powder is preferably 0.5% by mass or more, and more preferably 1% by mass or more, and further preferably 3% by mass or more. Further, in terms of the joining strength of the joining layer 2, the content of the processed powder is preferably 48% by mass or less, and more preferably 45% by mass, and still more preferably 43% by mass or less.

As used herein, the processed powder generated in the production of the silicon carbide-based honeycomb segments 1 means ground powder generated when the silicon carbide-based honeycomb segments 1 are ground into a predetermined shape, or powder obtained by crushing defective products of the silicon carbide-based honeycomb segments 1. Further, as used herein, the processed powder generated in the production of the silicon carbide-based honeycomb structure 10 means ground powder generated when the silicon carbide-based honeycomb structure 10 is ground into a predetermined shape or when the end face is ground to be smoothed, or powder obtained by crushing a defective product of the silicon carbide-based honeycomb structure 10 or the like.

The processed powder has an average particle diameter D50 of from 0.5 to 60 μm. The processed powder having the average particle size D50 in the above range can ensure the joining strength and the Young's modulus required for the joining layer 2. The average particle diameter D50 of the processed powder is preferably 0.8 μm or more, and more preferably 1.0 μm or more, and still more preferably 1.5 μm or more, in terms of the joining strength and Young's modulus of the joining layer 2. Similarly, the average particle diameter D50 of the processed powder is preferably 58 μm or less, and more preferably 56 μm or less, and still more preferably 55 μm or less, in terms of the joining strength and Young's modulus of the joining layer 2. As used herein, the average particle size D50 means a particle diameter at an integrated value of 50% in a cumulative particle size distribution (by volume) as determined by a laser diffraction/scattering method.

The processed powder has any average particle diameter D10, which may preferably be from 0.1 to 10 μm, and more preferably from 0.3 to 9.8 μm, and further preferably from 0.5 to 9.5 μm. The controlling of the average particle diameter D10 of the processed powder in such a range can lead to easy formation of the joining layers 2 having a good balance between the joining strength and the Young's modulus. The processed powder has any average particle diameter D90, which may preferably be from 4 to 150 μm, and more preferably from 5 to 130 μm, and still more preferably from 6 to 120 μm. The controlling of the average particle diameter D90 of the processed powder in such a range can lead to easy formation of the joining layers 2 having a good balance between the joining strength and the Young's modulus. As used herein, the average particle diameters D10 and D90 means particle diameters at the integrated values of 10% and 90%, respectively, in a cumulative particle diameter distribution (by volume) as determined by the same laser diffraction/scattering method as that for the average particle diameter D50.

The joining material may further contain at least one selected from inorganic powder, inorganic fibers, a pore former, a binder, and a dispersant, in addition to the processed powder. These components are not particularly limited, and those known in the art can be used. Further, these components may be the same as or different from the components used in the silicon carbide-based honeycomb segments 1. However, the same components as those used in the silicon carbide-based honeycomb segments 1 can lead to easy formation of the joining layers 2 having good joining strength and good Young's modulus.

The content of the inorganic powder in the joining material is not particularly limited, and it may preferably be 50% by mass or less, and more preferably from 1 to 48% by mass, and still more preferably from 5 to 46% by mass. The controlling of the content of the inorganic powder in the above range can lead to easy formation of the joining layers 2 having a good balance between the joining strength and the Young's modulus.

The content of the inorganic fibers in the joining material is not particularly limited, and it may preferably be 25% by mass or less, and more preferably from 1 to 20% by mass, and further preferably from 3 to 15% by mass. The controlling of the content of the inorganic fibers in the above range can lead to easy formation of the joining layers 2 having a good balance between the joining strength and the Young's modulus.

The content of the pore former in the joining material is not particularly limited, and it may preferably be 10% by mass or less, and more preferably from 0.1 to 8% by mass, and further preferably from 1 to 6% by mass. The controlling of the content of the pore former in the above range can lead to easy formation the joining layers 2 having the same porosity as that of the silicon carbide honeycomb segments 1 and having a good balance between the joining strength and the Young's modulus.

The content of the binder in the joining material is not particularly limited, and it may preferably be 15% by mass or less, and more preferably from 1 to 12% by mass, and still more preferably from 3 to 10% by mass. The controlling of the content of the binder in the above range can lead to easy formation of the joining layers 2 having a good balance between the joining strength and the Young's modulus.

The content of the dispersant in the joining material is not particularly limited, and it may preferably be 3% by mass or less, and more preferably 2% by mass or less, and further preferably from 0.1 to 1% by mass. The controlling of the content of the dispersant in the above range can lead to easy formation of the joining layers 2 having a good balance between the joining strength and the Young's modulus.

The joining material can be produced by adding water to the above components, mixing and kneading them using a kneading machine such as a mixer to form a paste.

The joining material obtained as described above can allow the processed powder generated in the production of the silicon carbide-based honeycomb segments 1 and/or the silicon carbide-based honeycomb structure 10 to be effectively used. In addition, the joining material can provide the joining layer 2 having higher joining strength and lower Young's modulus. Furthermore, since the joining material uses the processed powder generated in the production of the silicon carbide-based honeycomb segments 1 and/or the silicon carbide-based honeycomb structure 10, a color tone of the silicon carbide-based honeycomb segment 1 is close to a color tone of the joining layer 2. Therefore, it is possible to easily inspect an appearance defect of the silicon carbide-based honeycomb structure 10 using an automatic appearance inspection machine which has been difficult because of a larger color tone difference.

The silicon carbide-based honeycomb structure 10 is produced using the silicon carbide-based honeycomb segments 1 and the joining material as described above. It can be produced by any production method, such as by a method known in the art. More particularly, the joining material can be applied to the side surfaces of the silicon carbide-based honeycomb segments 1 to join the side surfaces of the silicon carbide-based honeycomb segments 1 to each other, and then dried to cure the joining material to form the joining layers 2. The drying conditions may be appropriately adjusted according to the composition of the joining material, and drying at a temperature of from 60 to 170° C. for 0.5 to 6.0 hours is preferable. The drying may be performed while applying a pressure from the outside to press the silicon carbide-based honeycomb segments 1 against each other. Further, the joined body in which all the silicon carbide-based honeycomb segments 1 are joined via the joining layers 2 may be processed into a desired shape such as a circular pillar shape such as by grinding the outer peripheral portion as needed. In this case, since the outer peripheral wall is removed by the processing and the inner partition walls 4 and the cells 3 are exposed, it is preferable to form again an outer peripheral coat layer 5 such as by covering the exposed surface with a coating material or the like.

The shape of the silicon carbide-based honeycomb structure 10 is not particularly limited, and it may be, in addition to the circular pillar shape, a pillar shape with elliptical pillar shaped end faces, and a polygonal pillar shape such as square, rectangular, triangular, pentagonal or hexagonal end faces.

The silicon carbide-based honeycomb structure 10 has a joining strength (shear strength) of each joining layer 2 of preferably from 200 to 2000 kPa, and more preferably from 300 to 1500 kPa, and still more preferably from 400 to 1200 kPa. The joining strength of the joining layer 2 within the above range can ensure an adhesive strength of the silicon carbide-based honeycomb structure 10 required for various applications such as DPFs and GPFs.

The silicon carbide-based honeycomb structure 10 has a Young's modulus of the joining layer 2 of preferably from 4 to 100 MPa, and more preferably from 5 to 80 MPa, and still more preferably from 6 to 60 MPa. The Young's modulus of the joining layer 2 within the above range can sufficiently ensure a function of relaxing thermal stress required for various applications such as DPFs and GPFs.

The silicon carbide-based honeycomb structure 10 has a porosity of the joining layer 2 of preferably from 40 to 85%, and more preferably from 45 to 83%, and still more preferably from 50 to 80%. The porosity of the joining layer 2 within the above range can ensure a balance between the adhesive strength and the Young's modulus.

The silicon carbide-based honeycomb structure 10 preferably has a thermal expansion coefficient of the joining layer 2 of from $2.0\times10^{-6}$ to $8.0\times10^{-6}$/K, and more preferably from $2.5\times10^{-6}$ to $7.5\times10^{-6}$/K, and even more preferably from $3.0\times10^{-6}$ to $7.0\times10^{-6}$/K. The thermal expansion coefficient of the joining layer 2 within the above range can sufficiently ensure a function of relaxing thermal stress.

Since the silicon carbide-based honeycomb structure 10 having the above features effectively utilizes the processed powder generated in the production of the silicon carbide-based honeycomb segments 1 and/or the silicon carbide-based honeycomb structure 10, the production cost can be reduced. Further, the silicon carbide-based honeycomb structure 10 has high durability because it has higher joining strength of the joining layer 2 and lower Young's modulus, thereby ensuring the function of relaxing thermal stress. Furthermore, since the silicon carbide-based honeycomb structure 10 has a color tone closer to the silicon carbide-based honeycomb segments 1 and the joining layers 2, an appearance defect of the silicon carbide-based honeycomb structure 10 can be easily inspected using an automatic appearance inspection machine.

The silicon carbide-based honeycomb structure 10 can be used as a dust collecting filter such as DPFs and GPFs. When it is used as a dust collecting filter, as described above, the plugged portions for plugging one ends of the cells 3 are preferably formed on one of the two end faces of each silicon carbide-based honeycomb segment 1. Typically, adjacent cells 3 are alternately plugged such that one end face and the other end face have a complementary checkered pattern.

When a fluid containing particulates such as soot is allowed to flow from one end face of the silicon carbide-based honeycomb structure 10 composed of the plugged silicon carbide honeycomb segments 1, on the one end face the fluid flows into the silicon carbide-based honeycomb structure 10 from the cells 3 having no plugged end face, passes through the porous partition walls 4 having a filtering ability, and then flows into other flow holes in which the other end surface side of the silicon carbide-based honeycomb structure 10 is not plugged. When passing through the partition walls 4, the particulates in the fluid are captured by the partition walls 4, and the purified fluid from which the particulates have been removed is discharged from the other end face of the silicon carbide-based honeycomb structure 10.

The silicon carbide-based honeycomb structure 10 may support a catalyst on surfaces of the partition walls 4 or in the pores. The catalyst is not particularly limited, and it can be selected according to the application of the silicon carbide-based honeycomb structure 10. For example, when the silicon carbide-based honeycomb structure 10 is used as a DPF, an oxidation catalyst for oxidizing and removing soot and the like in an exhaust gas, and a NOx selective catalytic reduction (SCR) catalyst or NOx storage reduction catalyst for decomposing and removing harmful substances such as NOx contained in the exhaust gas, or the like can be used. The method for supporting the catalyst is not particularly limited, and a method known in the art can be used.

EXAMPLES

Hereinafter, the present invention will be more specifically described with reference to Examples, but the present invention is not limited to these Examples.

(Production of Silicon Carbide-Base Honeycomb Segment)

Silicon carbide powder and metallic silicon powder as raw materials were mixed at a mass ratio of 80:20, to which a pore former, a binder, a surfactant and water were added, mixed and kneaded to obtain a green body. The resulting green body was then extruded, cut, and dried by microwaves and hot air to obtain a silicon carbide-based honeycomb segment having a thickness of each partition wall of 300 μm, a cell density of 46.5 cells/cm$^2$, a square cross sectional shape having one side of 38 mm, which was perpendicular to the cell extending direction, and a length of 152 mm. One end of each cell of the silicon carbide-based honeycomb segment was plugged such that the end face presented a checkered pattern. It should be note that the same material as the honeycomb segment raw material was used for the plugging slurry for plugging the ends of the cells. The plugging was performed by drying the filler, and then degreasing the silicon carbide-based honeycomb segment in an air atmosphere at 400° C., and then firing it in an Ar inert atmosphere at 1450° C.

(Preparation of Joining Material)

A pasty joining material was prepared by blending and mixing the processed powder, the inorganic powder, the inorganic fiber, the binder, the pore former and the dispersant, and the balance of water (in a ratio of 100% by mass in total) as shown in Table 1. As the processed powder, ground powder of the above silicon carbide-based honeycomb segment and the crushed powder of the defective product were used.

(Production of Silicon Carbide-Based Honeycomb Structure)

The joining material was applied to the side surface of the silicon carbide-based honeycomb segment so as to have a thickness of 1 mm, and was joined to the side surface of the other silicon carbide-based honeycomb segment. This process was repeated to produce a total of 16 silicon carbide-based honeycomb segment laminates in which four vertical silicon carbide-based honeycomb segments and four lateral silicon carbide-based honeycomb segments were joined. Subsequently, the silicon carbide-based honeycomb segments were dried at 120° C. for 2 hours while being pressed against each other by applying a pressure from the outside to obtain a joined body. An outer periphery of the joined body was cut such that the cross section in the direction perpendicular to the central axis of the resulting joined body was circular. Subsequently, the processed surface was coated with an outer peripheral coating material having the same composition as that of the joining material, and then dried and cured by heating at 600° C. for 0.5 hours or more to form an outer peripheral coat layer to obtain the silicon carbide-based honeycomb structure.

The following evaluations were carried out for the silicon carbide-based honeycomb structure obtained above.

(1) Adhesive Strength (Shear Strength) of the Joining Layer;

A sample with two silicon carbide-based honeycomb segments joined was cut out from the silicon carbide-based honeycomb structure. A shear load was then applied in a Y-axis direction (a longitudinal direction) of the joining layer of this sample. The shear strength was then calculated by the following equation (1) using the fracture load and the area of the joining layer at that time:

$$\sigma = (W/S) \times 1000 \tag{1}$$

in which:
σ is a shear strength (kPa);
W is a fracture load (N); and
S is an area of the joining layer (mm²).

(2) Young's Modulus of Joining Layer

A circular pillar shaped sample having certain dimensions (diameter: 25.4 mm, thickness: 3 mm) including joining layer portions was cut out from the silicon carbide-based honeycomb structure. The sample was then subjected to a compression test in a Z-axis direction. Here, the "Z-axis direction" is a direction perpendicular to the joined surface of the joining layer to the silicon carbide-based honeycomb segment. In the test, the sample may have a part of the silicon carbide-based honeycomb segment. A gradient in a stress-strain curve when a load was applied from 0 to 3 MPa to the sample in the Z-axis direction was calculated as Young's modulus (compression Young's modulus) by the following equation (2):

$$E = (W/S) \times (t/\Delta t) \tag{2}$$

in which:
E is a compression Young's modulus (MPa);
W is a load (N);
S is an area of the sample (mm²);
T is a thickness of the sample (mm) and
Δt is an amount of a change in the thickness of the sample.

(3) Porosity of Joining Layer

The porosity of the joining layer was measured by cutting out a joining layer portion from the silicon carbide-based honeycomb structure and using a mercury porosimeter (Autopore IV9500 from Micromeritics).

(4) Thermal Expansion Coefficient of Joining Layer

A sample of a joining layer was separately prepared from the joining material used for producing the silicon carbide-based honeycomb structure, and the thermal expansion coefficient was evaluated. The sample of the joining layer was obtained by cutting a dried body obtained by drying the joining material at 140° C. for 2 hours so as to have a length of 3 mm, a width of 3 mm, and a length of 20 mm. The thermal expansion coefficient was determined by measuring an average linear thermal expansion coefficient (a thermal expansion coefficient) at a temperature of from 40 to 800° C. in the length direction of the sample, in accordance with JIS R 1618: 2002.

(5) Dry Crack of Joining Layer

Dry crack was determined by visually observing the joining layer on the end face of the silicon carbide-based honeycomb structure. A case where no dry crack was found was represented by "A", a case where only a minute dry crack with a length of 5 mm or less was found was represented by "B", and a case where a dry crack with a length of more than 5 mm was found was represented by "C".

(6) Joined Width of Joining Layer

A joined width of the joining layer was determined by measuring the joined width of the joining layer on the end face of the silicon carbide-based honeycomb structure. A case where the joined width was 1.5 mm or less was represented by "A", a case where the joined width was more than 1.5 mm and less than 3.0 mm was represented by "B", and a case where the joined width was 3.0 mm or more was represented by "C". Table 1 shows the results of the above evaluations.

TABLE 1

|  |  | Example | | | | | | | | | |
|---|---|---|---|---|---|---|---|---|---|---|---|
|  |  | 1 | 2 | 3 | 4 | 5 | 6 | 7 | 8 | 9 | 10 |
| Processed Powder (% by mass) | | 50 | 20 | 40 | 15 | 25 | 50 | 35 | 40 | 40 | 10 |
| Inorganic Powder (% by mass) | Silicon Carbide | 0 | 23 | 0 | 32 | 15 | 0 | 0 | 0 | 0 | 30 |
| | Cordierite | 0 | 5 | 5 | 0 | 5 | 0 | 0 | 3 | 6 | 3 |
| | Alumina | 0 | 2 | 5 | 0 | 2 | 0 | 0 | 2 | 3 | 2 |

TABLE 1-continued

| | | | | | | | | | | | |
|---|---|---|---|---|---|---|---|---|---|---|---|
| Inorganic Fiber (% by mass) | Mullite Fiber | 12 | 12 | 12 | 13 | 12 | 8 | 23 | 12 | 8 | 12 |
| Binder (% by mass) | Colloidal Silica[1)] | 17 | 17 | 17 | 20 | 20 | 25 | 24 | 25 | 25 | 20 |
| | Organic Binder | 1 | 1 | 1 | 1 | 1 | 1 | 1 | 1 | 1 | 1 |
| Pore Former (% by mass) | Foaming Resin | 3 | 5 | 3 | 4 | 5 | 3 | 3 | 3 | 4 | 5 |
| Dispersant (% by mass) | | 0.5 | 0.5 | 0.5 | 0.5 | 0.5 | 0.5 | 0.5 | 0.5 | 0.5 | 0.5 |
| Processed Powder | D10 (μm) | 0.5 | 2.0 | 4.0 | 8.5 | 9.0 | 0.5 | 0.5 | 2.0 | 2.0 | 2.0 |
| | D50 (μm) | 2.5 | 10.0 | 20.0 | 40.0 | 55.0 | 2.5 | 2.5 | 10.0 | 10.0 | 10.0 |
| | D90 (μm) | 5.0 | 26.0 | 50.0 | 85.0 | 108.0 | 5.0 | 5.0 | 26.0 | 26.0 | 26.0 |
| Joining Strength (kPa) | | 900 | 850 | 1000 | 650 | 400 | 1000 | 850 | 750 | 650 | 900 |
| Young's Modulus (MPa) | | 30 | 45 | 40 | 35 | 10 | 45 | 40 | 30 | 25 | 35 |
| Porosity (%) | | 75 | 70 | 75 | 75 | 80 | 65 | 65 | 70 | 70 | 70 |
| Thermal Expansion Coefficient ($\times 10^{-6}$/K) | | 6 | 5 | 6 | 5 | 5 | 6 | 5 | 6 | 6 | 5 |
| Dry Crack | | A | B | B | B | B | A | A | B | B | A |
| Joined Width | | A | A | B | B | B | A | B | A | A | A |

| | | Example | | | | | Comparative Example | | | | |
|---|---|---|---|---|---|---|---|---|---|---|---|
| | | 11 | 12 | 13 | 14 | 15 | 1 | 2 | 3 | 4 | 5 |
| Processed Powder (% by mass) | | 35 | 40 | 4 | 10 | 10 | 0 | 60 | 60 | 25 | 25 |
| Inorganic Powder (% by mass) | Silicon Carbide | 0 | 0 | 38 | 0 | 0 | 41 | 0 | 0 | 16 | 16 |
| | Cordierite | 0 | 9 | 6 | 0 | 36 | 7 | 0 | 0 | 3 | 3 |
| | Alumina | 0 | 6 | 2 | 36 | 0 | 2 | 0 | 0 | 2 | 2 |
| Inorganic Fiber (% by mass) | Mullite Fiber | 24 | 4 | 12 | 8 | 8 | 12 | 0 | 4 | 12 | 12 |
| Binder (% by mass) | Colloidal Silica[1)] | 25 | 25 | 17 | 25 | 25 | 17 | 18 | 18 | 18 | 18 |
| | Organic Binder | 1 | 1 | 1 | 1 | 1 | 1 | 1 | 1 | 1 | 1 |
| Pore Former (% by mass) | Foaming Resin | 1 | 2 | 5 | 3 | 3 | 5 | 5 | 0 | 5 | 5 |
| Dispersant (% by mass) | | 0.5 | 0.5 | 0.5 | 0.5 | 0.5 | 0.5 | 0.5 | 0.5 | 0.5 | 0.5 |
| Processed Powder | D10 (μm) | 2.0 | 2.0 | 4.0 | 0.5 | 0.5 | — | 2.0 | 2.0 | 16.0 | 0.0 |
| | D50 (μm) | 10.0 | 10.0 | 20.0 | 2.5 | 2.5 | — | 10.0 | 10.0 | 79.0 | 0.3 |
| | D90 (μm) | 26.0 | 26.0 | 50.0 | 5.0 | 5.0 | — | 26.0 | 26.0 | 160.0 | 3.0 |
| Joining Strength (kPa) | | 1800 | 1500 | 1100 | 650 | 500 | 900 | 150 | 350 | 250 | 150 |
| Young's Modulus (MPa) | | 90 | 85 | 45 | 15 | 10 | 30 | 5 | 80 | 10 | 5 |
| Porosity (%) | | 55 | 60 | 75 | 75 | 75 | 70 | 85 | 80 | 80 | 85 |
| Thermal Expansion Coefficient ($\times 10^{-6}$/K) | | 5 | 6 | 5 | 7 | 3 | 5 | 6 | 6 | 5 | 5 |
| Dry Crack | | A | B | A | B | B | A | C | C | C | C |
| Joined Width | | B | A | A | B | B | A | C | C | B | B |

[1)]The solid content is 40% by mass.

As shown in Table 1, each of the silicon carbide-based honeycomb structures of Examples 1 to 15 produced using the joining material containing the processed powder had a joining strength and a Young's modulus comparable to those of the silicon carbide-based honeycomb structure of Comparative Example 1 produced using the joining material containing no processed powder. It is, therefore, found that the processed powder can be effectively utilized as the joining material. Further, as shown in Table 1, each of the silicon carbide-based honeycomb structures of Examples 1 to 15 produced using the joining material in which the content of the processed powder and the average particle diameter D50 were controlled in certain ranges had higher joining strength of the joining layer than that of each of the silicon carbide-based honeycomb structures of Comparative Examples 2 to 4 produced using the joining material in which the content of the processed powder was beyond the certain range or the joining material in which the average particle diameter D50 of the processed powder was beyond the certain range. It should be noted that each of the silicon carbide-based honeycomb structures of Examples 1 to 15 had a higher Young's modulus of the joining layer than that of each of the silicon carbide-based honeycomb structures of Comparative Examples 2 to 4, but it was at a usable level.

As can be seen from the above results, according to the present invention, it is possible to provide a joining material and a silicon carbide-based honeycomb structure, which can effectively utilize processed powder generated in the production of the silicon carbide-based honeycomb segments and/or the silicon carbide-based honeycomb structure.

DESCRIPTION OF REFERENCE NUMERALS

1 silicon carbide-based honeycomb segment
2 joining layer
3 cell 4 partition wall
5 outer peripheral coat layer
10 silicon carbide-based honeycomb structure

What is claimed is:

1. A joining material used for joining side surfaces of a plurality of silicon carbide-based honeycomb segments to each other to produce a silicon carbide-based honeycomb structure, the joining material containing from 0.1 to 50% by mass of processed powder generated in the production of the silicon carbide-based honeycomb segments and/or the silicon carbide-based honeycomb structure, the joining material having an average particle diameter D50 of from 0.5 to 60 µm;
   wherein the processed powder has a particle size D90 of from 4 to 150 µm in a cumulative particle diameter distribution on a volume basis;
   wherein the processed powder has a particle size D10 of from 0.1 to 10 µm in the cumulative particle diameter distribution on the volume basis;
   wherein the joining material contains from 0.1 to 8% by mass of a pore former;
   wherein the processed powder is a composite material of silicon carbide powder and metallic silicon; and
   wherein the joining material is a pasty joining material when joining the side surfaces of the plurality of silicon carbide-based honeycomb segments.

2. The joining material according to claim 1, further comprising at least one selected from inorganic powder, inorganic fibers, a binder, and a dispersant.

3. A silicon carbide-based honeycomb structure, the silicon carbide-based honeycomb structure comprising: a plurality of silicon carbide-based honeycomb segments; and joining layers, the joining layers joining side surfaces of the plurality of silicon carbide-based honeycomb segments to each other, wherein each of the joining layers is a cured layer of the joining material according to claim 1.

4. The silicon carbide-based honeycomb structure according to claim 3, wherein the joining layers have a joining strength of from 200 to 2000 kPa.

5. The silicon carbide-based honeycomb structure according to claim 3, wherein the joining layers have a Young's modulus of from 4 to 100 MPa.

6. The silicon carbide-based honeycomb structure according to claim 3, wherein the joining layers have a porosity of from 40 to 85%.

7. The silicon carbide-based honeycomb structure according to claim 3, wherein the joining layers have a thermal expansion coefficient of from $2.0 \times 10^{-6}$ to $8.0 \times 10^{-6}$/K.

* * * * *